(12) United States Patent
Kim et al.

(10) Patent No.: US 12,202,726 B2
(45) Date of Patent: Jan. 21, 2025

(54) DEHYDROGENATION REACTION DEVICE AND SYSTEM HAVING THE SAME

(71) Applicants: HYUNDAI MOTOR COMPANY, Seoul (KR); KIA CORPORATION, Seoul (KR); KOREA INSTITUTE OF SCIENCE AND TECHNOLOGY, Seoul (KR)

(72) Inventors: Pyung Soon Kim, Suwon-si (KR); Jin Woo Choung, Suwon-si (KR); Jihui Seo, Ulsan (KR); Suk Woo Nam, Seoul (KR); Young Suk Jo, Seoul (KR); Hyangsoo Jeong, Seoul (KR); Jaewon Kirk, Seoul (KR); Chang Won Yoon, Seoul (KR); Yongmin Kim, Seoul (KR)

(73) Assignees: HUYNDAI MOTOR COMPANY, Seoul (KR); KIA CORPORATION, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 18/387,793

(22) Filed: Nov. 7, 2023

(65) Prior Publication Data
US 2024/0076182 A1 Mar. 7, 2024

Related U.S. Application Data

(63) Continuation of application No. 17/348,552, filed on Jun. 15, 2021, now abandoned.

(30) Foreign Application Priority Data

Feb. 8, 2021 (KR) .................. 10-2021-0017384

(51) Int. Cl.
*C01B 3/06* (2006.01)
*B01J 19/00* (2006.01)
(Continued)

(52) U.S. Cl.
CPC .......... *C01B 3/065* (2013.01); *B01J 19/0013* (2013.01); *H01M 8/04216* (2013.01);
(Continued)

(58) Field of Classification Search
CPC .............. C01B 3/065; C01B 2300/085; C01B 2300/0872; B01J 19/0013;
(Continued)

(56) References Cited

U.S. PATENT DOCUMENTS 5,372,617 A    12/1994 Kerrebrock et al.
7,959,896 B2   6/2011  Mertens
(Continued)

FOREIGN PATENT DOCUMENTS

CN    101124154 A      2/2008
CN    106276790 A  *   1/2017  ............... C01B 3/06
(Continued)

OTHER PUBLICATIONS

Machine Translation of CN-106276790-A (Jun. 7, 2024) (Year: 2024).*
(Continued)

*Primary Examiner* — Matthew J Merkling
(74) *Attorney, Agent, or Firm* — Lempia Summerfield Katz LLC (57) ABSTRACT

An operating method is disclosed for a dehydrogenation reaction system. The method includes providing a system having: an acid aqueous solution tank including an acid aqueous solution; a dehydrogenation reactor including a chemical hydride of a solid state and receiving an acid aqueous solution from the acid aqueous solution tank to react the chemical hydride with the acid aqueous solution to generate hydrogen; and a fuel cell stack receiving hydrogen generated from the dehydrogenation reactor to be reacted with oxygen to generate water and simultaneously to gen-
(Continued)

erate electrical energy. The method also includes recycling the water generated from the fuel cell stack to one or all of the acid aqueous solution tank, the dehydrogenation reactor, and a separate water tank. The acid is formic acid and, in in the dehydrogenation reactor, the temperature is in a range of 10° C. to 400° C. and the pressure is in a range of 1 bar to 100 bar.

16 Claims, 10 Drawing Sheets

(51) Int. Cl.
    *H01M 8/04082*      (2016.01)
    *H01M 8/065*      (2016.01)

(52) U.S. Cl.
    CPC .... *H01M 8/065* (2013.01); *B01J 2219/00051* (2013.01); *B01J 2219/00162* (2013.01); *C01B 2203/085* (2013.01); *C01B 2203/0872* (2013.01)

(58) Field of Classification Search
    CPC ............. B01J 2219/00051; B01J 2219/00162; H01M 8/04216; H01M 8/065
    See application file for complete search history.

(56) References Cited

U.S. PATENT DOCUMENTS

| | | | |
|---|---|---|---|
| 2002/0081235 A1 | 6/2002 | Baldwin et al. | |
| 2005/0036941 A1 | 2/2005 | Bae et al. | |
| 2005/0191234 A1 | 9/2005 | Mertens | |
| 2005/0276746 A1* | 12/2005 | Zhang | C01B 3/065 |
| | | | 422/146 |
| 2007/0020172 A1 | 1/2007 | Withers-kirby et al. | |
| 2007/0207085 A1 | 9/2007 | Troczynski | |
| 2007/0264190 A1* | 11/2007 | Zhang | C01B 3/0005 |
| | | | 429/421 |
| 2008/0260630 A1 | 10/2008 | Pez | |
| 2011/0194992 A1 | 8/2011 | Barton et al. | |
| 2012/0195825 A1* | 8/2012 | Koschany | C01B 3/065 |
| | | | 422/119 |
| 2015/0207160 A1 | 7/2015 | Masetti-placci et al. | |
| 2018/0319659 A1* | 11/2018 | Lugtigheid | B01J 7/02 |
| 2021/0299627 A1 | 9/2021 | Nam et al. | |
| 2022/0115682 A1 | 4/2022 | Allinson et al. | |

FOREIGN PATENT DOCUMENTS

| | | |
|---|---|---|
| CN | 106334561 A | 1/2017 |
| CN | 109585879 A | 4/2019 |
| CN | 112174089 A | 1/2021 |
| CN | 113387327 A | 9/2021 |
| DE | 102014006430 A1 | 11/2015 |
| KR | 101584518 B1 | 1/2016 |
| KR | 102177145 B1 | 11/2020 |
| WO | 2005102914 A2 | 11/2005 |
| WO | WO-2007136629 A2 * | 11/2007 ......... B01J 19/2475 |

OTHER PUBLICATIONS

Keceli et al. "Ruthenium(III) acetylacetonate: A homogeneous catalyst in the hydrolysis of sodium borohydride", Journal of Molecular Catalysis A: Chemical 286 (2008) 87-91 (Year: 2008).

M. Niermann et al., Liquid organic hydrogen carriers (LOHCs)—techno-economic analysis of LOHCs in a defined process chain, Energy Environ. Sci., 2019, 12; https://doi.org/10.1039/C8EE02700E; 18 pp.

Murugesan et al., Effects of acid accelerators on hydrogen generation from solid sodium borohydride using small scale devices, Journal of Power Sources 187; 2009; pp. 216-223.

Soon-Mo Kwon et al., Development of a high-storage-density hydrogen generator using solid-state NaBH4 as a hydrogen source for unmanned aerial vehicles, Applied Energy; vol. 251, Oct. 1, 2019, https://doi.org/10.1016/j.apenergy.2019.113331; 9 pp.

Office Action cited in Chinese patent application No. 202110749718.0; Jun. 25, 2024; pp. 1-16.

Plastic Rubber Processing Aids; edited by Shanxi Institute of Chemical Technology, p. 441, Chemical Industry Press, May 1983; pp. 1-5.

Teng He et al.; Liquid organic hydrogen carriers, Journal of Energy Chemistry vol. 24; 2015; pp. 587-594.

Zhu Gangli et al; Hydrogen Storage Using Liquid Organic Hydrides; Progress in Chemistry, vol. 21 No. 12, Dec. 2009, pp. 2760-2770.

* cited by examiner

DEHYDROGENATION REACTION DEVICE AND SYSTEM HAVING THE SAME

CROSS-REFERENCE TO RELATED APPLICATION

The present application is a continuation of U.S. application Ser. No. 17/348,552 filed Jun. 15, 2021 and which claims priority to and the benefit of Korean Patent Application No. 10-2021-0017384 filed in the Korean Intellectual Property Office on Feb. 8, 2021. The entire contents of these prior filed applications are incorporated herein by reference.

BACKGROUND DISCLOSURE

(a) Field of the Disclosure

The present disclosure relates to a dehydrogenation reaction device, a dehydrogenation reaction system including the same, and a method of operating the system for supplying hydrogen to a fuel cell stack.

(b) Description of the Related Art

Due to depletion of fossil energy and environmental pollution problems, there is a great demand for renewable and alternative energy, and hydrogen is attracting attention as one of such alternative energies.

A fuel cell and a hydrogen combustion device use hydrogen as a reaction gas, and in order to apply the fuel cell and the hydrogen combustion device to vehicles and various electronic products for example, a stable and continuous supply technology of hydrogen is required.

In order to supply hydrogen to a device that uses hydrogen, a method of receiving hydrogen from a separately installed hydrogen supply source may be used. In this way, compressed hydrogen or liquid hydrogen may be used.

Alternatively, a method of generating hydrogen through a reaction of a corresponding material after mounting a material in which hydrogen is stored on a device using hydrogen and supplying it to the device using hydrogen may be used. For this method, for example, a method using a liquid hydride, a method using adsorption or absorbents/carbon, and a method using chemical hydrogen storage have been proposed.

However, in the case of the method using a liquid hydride, since the hydride is diluted and used with a low concentration to maintain the liquid state even after a hydrolysis reaction of the hydride is completed, a volume of the storage tank is large and a separate recovery tank is also required. In addition, a gas-liquid separator may be required because excess moisture is contained in the hydrogen gas after the reaction. This increases the volume and weight of the system as a whole and decreases the hydrogen storage capacity.

The above information disclosed in this Background section is only for enhancement of understanding of the background of the disclosure, and therefore it may contain information that does not form the prior art that is already known in this country to a person of ordinary skill in the art.

SUMMARY

One embodiment provides a dehydrogenation reaction device capable of maximizing a hydrogen storage amount compared to a material by preventing vaporization of water and reducing a use amount of water through a device configuration capable of high temperature/high pressure operation.

Another embodiment provides a dehydrogenation reaction system capable of reducing a water storage capacity by recycling water generated from a fuel cell, increasing a hydrogen storage capacity for the system, and reducing a system cost and weight by removing a gas-liquid separator and a recovery tank from the system.

Another embodiment provides a method of operating the dehydrogenation reaction system.

According to an embodiment, a dehydrogenation reaction device including a dehydrogenation reactor including: a solid chemical hydride; and an acid aqueous solution tank supplying an acid aqueous solution to the dehydrogenation reactor is provided, wherein the dehydrogenation reactor includes a heating device, a cooling apparatus, a porous metal foam, or a combination thereof.

The porous metal foam may be positioned in the center of the width direction of the dehydrogenation reactor and extend in the length direction of the dehydrogenation reactor, and the side of the length direction of at least the porous metal foam may be surrounded by the chemical hydride.

The porous metal foam may be a porous nickel foam or a porous cobalt-nickel foam.

The dehydrogenation reactor may include 0 parts by volume to 100 parts by volume of the porous metal foam with respect to 100 parts by volume of the chemical hydride.

The acid aqueous solution may be supplied to the dehydrogenation reactor by gravity or a pump.

The chemical hydride may include sodium borohydride ($NaBH_4$), lithium borohydride ($LiBH_4$), potassium borohydride ($KBH_4$), ammonium borohydride ($NH_4BH_4$), ammonia borohydride ($NH_3BH_3$), tetramethyl ammonium borohydride ($(CH_3)_4NH_4BH_4$), sodium aluminum hydride ($NaAlH_4$), lithium aluminum hydride ($LiAlH_4$), potassium aluminum hydride ($KAlH_4$), calcium diborohydride ($Ca(BH_4)_2$), magnesium diborohydride ($Mg(BH_4)_2$), sodium gallium hydride ($NaGaH_4$), lithium gallium hydride ($LiGaH_4$), potassium gallium hydride ($KGaH_4$), lithium hydride ($LiH$), calcium hydride ($CaH_2$), magnesium hydride ($MgH_2$), or mixture thereof.

The acid may be sulfuric acid, nitric acid, phosphoric acid, hydrochloric acid, boric acid, a heteropoly acid, acetic acid, formic acid, malic acid, citric acid, tartaric acid, ascorbic acid, lactic acid, an oxalic acid, succinic acid, tauric acid, or a mixture thereof.

In the dehydrogenation reactor, the dehydrogenation reaction may be performed by reacting 1 mol of hydrogen atoms of the chemical hydride with an acid and water at a molar ratio of 0.5 to 2.

In the dehydrogenation reactor, the temperature of the dehydrogenation reaction may be 10° C. to 400° C., and the pressure may be 1 bar to 100 bar.

The gas product produced in the dehydrogenation reactor may include 99 volume % or greater of hydrogen and 1 volume % or less of water.

According to another embodiment, a dehydrogenation reaction system including an acid aqueous solution tank including an acid aqueous solution; a dehydrogenation reactor including a chemical hydride of a solid state and receiving an acid aqueous solution from the acid aqueous solution tank to react the chemical hydride with the acid aqueous solution to generate hydrogen; and a fuel cell stack receiving hydrogen generated from the dehydrogenation reactor to be reacted with oxygen to generate water and simultaneously to generate electrical energy may be provided, wherein the water generated from the fuel cell stack is recycled to the acid aqueous solution tank, the dehydrogenation reactor, a separate water tank, or all of the above.

The acid aqueous solution may be supplied to the dehydrogenation reactor by gravity or a pump.

The dehydrogenation reaction system may further include a gas cooler that can be cooling the hydrogen generated from the dehydrogenation reactor, and a buffer tank that receives and stores hydrogen from the gas cooler.

The dehydrogenation reaction system may further include a pressure regulator between the gas cooler and the buffer tank, between the buffer tank and the fuel cell stack, or both.

The dehydrogenation reaction system may further include a sensor inside or outside the dehydrogenation reactor, a temperature sensor and a pressure sensor, or a mass flow meter between the buffer tank and the fuel cell stack.

The acid aqueous solution tank may be pressurized by receiving hydrogen from the dehydrogenation reactor, the gas cooler, the buffer tank, or a combination thereof.

The dehydrogenation reaction system may not include a gas-liquid separator to separate hydrogen and water from the reaction products produced in the dehydrogenation reactor.

The dehydrogenation reaction system may further include a pump, a filter, or both.

According to another embedment, an operating method for a dehydrogenation reaction system includes providing an acid aqueous solution tank including an acid aqueous solution. The method also includes providing a dehydrogenation reactor including a chemical hydride of a solid state and receiving an acid aqueous solution from the acid aqueous solution tank to react the chemical hydride with the acid aqueous solution to generate hydrogen. The method also includes providing a fuel cell stack receiving hydrogen generated from the dehydrogenation reactor to be reacted with oxygen to generate water and simultaneously to generate electrical energy. The method also includes recycling the water generated from the fuel cell stack to the acid aqueous solution tank, the dehydrogenation reactor, a separate water tank, or all of the acid aqueous solution tank, the dehydrogenation reactor, and the separate water tank. The method also includes the acid being formic acid. According to the method, in the dehydrogenation reactor, the temperature is in a range of 10° C. to 400° C. and the pressure is in a range of 1 bar to 100 bar.

The acid aqueous solution may be supplied to the dehydrogenation reactor by gravity or a pump.

The dehydrogenation reaction system may further include a gas cooler cooling the hydrogen generated from the dehydrogenation reactor and a buffer tank that receives and stores hydrogen from the gas cooler.

The dehydrogenation reaction system may further include a pressure regulator between the gas cooler and the buffer tank, between the buffer tank and the fuel cell stack, or both.

The dehydrogenation reaction system further include a mass flow meter between the buffer tank and the fuel cell stack.

The acid aqueous solution tank may be pressurized by receiving hydrogen from the dehydrogenation reactor, the gas cooler, the buffer tank, or a combination thereof.

The dehydrogenation reaction system may not include a gas-liquid separator to separate hydrogen and water from the reaction products produced in the dehydrogenation reactor.

The dehydrogenation reaction system may further include a pump, a filter, or both.

The dehydrogenation reactor may include a heating device, a cooling apparatus, a porous metal foam, or a combination thereof.

The porous metal foam may be positioned in the center of a width direction of the dehydrogenation reactor and may extend in a length direction of the dehydrogenation reactor. The side of the length direction of at least the porous metal foam may be surrounded by the chemical hydride.

The porous metal foam may be a porous nickel foam or a porous cobalt-nickel foam.

The dehydrogenation reactor may include more than 0 parts by volume and 100 parts by volume or less of the porous metal foam with respect to 100 parts by volume of the chemical hydride.

The acid aqueous solution may be supplied to the dehydrogenation reactor by gravity or a pump.

The acid aqueous solution tank may be pressurized by supplying hydrogen generated in the dehydrogenation reactor.

The chemical hydride may include $NaBH_4$, $LiBH_4$, $KBH_4$, $NH_4BH_4$, $NH_3BH_3$, $(CH_3)_4NH_4BH_4$, $NaAlH_4$, $LiAlH_4$, $KAlH_4$, $Ca(BH_4)_2$, $Mg(BH_4)_2$, $NaGaH_4$, $LiGaH_4$, $KGaH_4$, $LiH$, $CaH_2$, $MgH_2$, or a mixture thereof.

In the dehydrogenation reactor, a dehydrogenation reaction may be performed by reacting 1 mol of hydrogen atoms of the chemical hydride with an acid and water at a molar ratio of 0.5 to 2.

A gas product produced in the dehydrogenation reactor may include 99 volume % or greater of hydrogen and 1 volume % or less of water.

The dehydrogenation reaction device according to an embodiment may maximize the amount of hydrogen storage compared to the material by preventing the vaporization of the water and reducing the amount of the water used through the device configuration capable of operating at high temperature/high pressure.

The dehydrogenation reaction system and operating method according to further embodiments may increase the conversion rate of the hydrolysis reaction by recycling the water generated from the fuel cell and increasing the hydrogen storage capacity by removing the gas-liquid separator and the recovery tank from the system, and the system cost and weight may be reduced.

DETAILED DESCRIPTION OF THE EMBODIMENTS

The advantages, features, and aspects that are described hereinafter should become apparent from the following description of the embodiments with reference to the accompanying drawings, which is set forth hereinafter. However, the present disclosure may be not limited to embodiments that are described herein. Although not specifically defined, all of the terms including the technical and scientific terms used herein have meanings understood by persons having ordinary skill in the art. The terms have specific meanings coinciding with related technical references and the present specification as well as lexical meanings. In other words, the terms are not to be construed as having idealized or formal meanings. Throughout the specification and claims which follow, unless explicitly described to the contrary, the word "comprise/include" or variations such as "comprises/includes" or "comprising/including" should be understood to imply the inclusion of stated elements but not the exclusion or any other elements.

The terms of a singular form may include plural forms unless referred to the contrary.

In the drawings, the thickness of layers, films, panels, regions, etc., are exaggerated for clarity. Like reference numerals designate like elements throughout the specification.

It should be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 1:
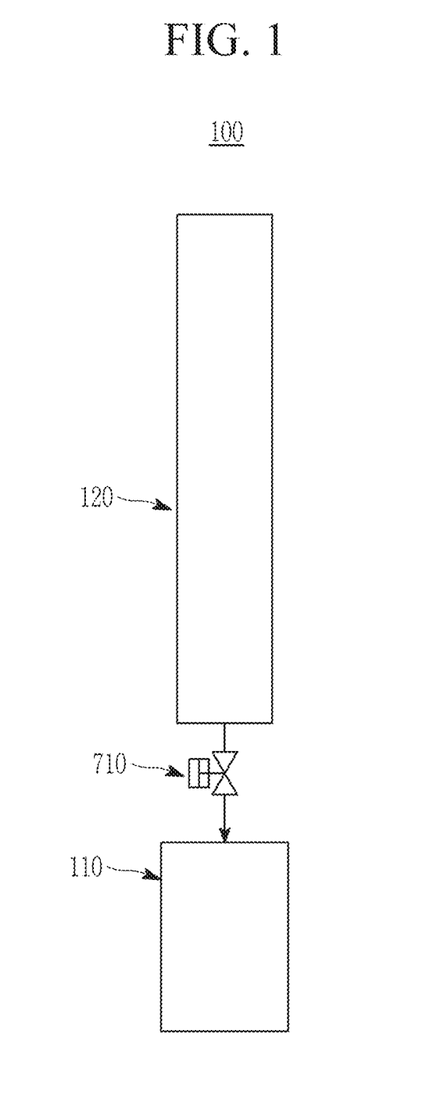
FIG. 1 is a view schematically showing a dehydrogenation reaction device according to an embodiment.
Figure 2:
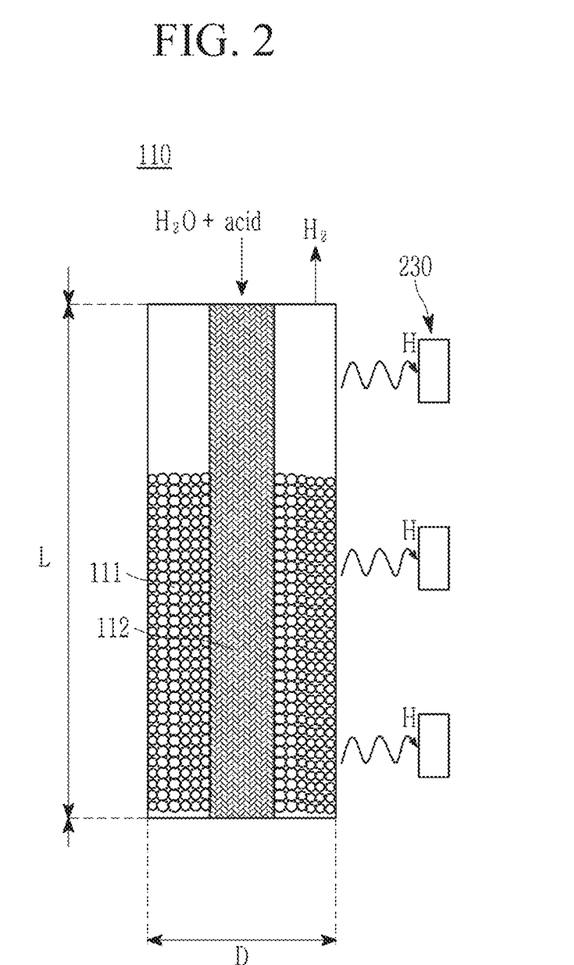
FIG. 2 is an enlarged cross-sectional view of a dehydrogenation reactor in FIG. 1.

FIG. 1 is a view schematically showing a dehydrogenation reaction device according to an embodiment, and FIG. 2 is an enlarged cross-sectional view of a dehydrogenation reactor in FIG. 1. Now, a dehydrogenation reaction device is described in detail with reference to FIG. 1 and FIG. 2.

Referring to FIG. 1, a dehydrogenation reaction device 100 includes a dehydrogenation reactor 110 and an acid aqueous solution tank 120.

The dehydrogenation reactor 110 may be composed of a high temperature and high pressure vessel so that a dehydrogenation reaction may be carded out in high temperature and high pressure conditions. For example, the dehydrogenation reactor 110 may have a shape such as a cylinder, a sphere, a cuboid, or a polygonal column, and particularly may have a cylinder shape.

Referring to FIG. 2, the dehydrogenation reactor 110 may have a high aspect ratio in which a ratio L/D of a length L to a width D is high. Here, the width D of the dehydrogenation reactor 110 is shorter than the length L.

In the dehydrogenation reactor 110, the aspect ratio L/D of the length L to the width D may be 1 to 10, and for example, may be 5 to 8. When the dehydrogenation reactor 110 has the high aspect ratio, it is possible to maximize release of reaction heat during the dehydrogenation reaction and minimize the use of a pump by utilizing a water level difference. However, when the reaction heat generated in the dehydrogenation reactor 110 is removed through the cooling apparatus 230, the aspect ratio of the dehydrogenation reactor 110 may be omitted.

The dehydrogenation reactor 110 includes a chemical hydride 111 of a solid state.

The chemical hydride 111 as a solid state, for example, may be in a form of any one of a powder form, a granular form, a bead form, a microcapsule form, and a pellet form. When the chemical hydride 111 is stored in an aqueous solution (a concentration, in one example, of about 20% of the chemical hydride), a large amount of the chemical hydride 111 may not be stored, but when the chemical hydride 111 is stored in a solid state, large capacity storage is possible.

The chemical hydride may be any compound that may be hydrolyzed to generate hydrogen and a hydrolysate, for example, $NaBH_4$, $LiBH_4$, $KBH_4$, $NH_4BH_4$, $NH_3BH_3$, $(CHS)_4NH_4BH_4$, $NaAlH_4$, $LiAlH_4$, $KAlH_4$, $Ca(BH_4)_2$, $Mg(BH_4)_2$, $NaGaH_4$, $LiGaH_4$, $KGaH_4$, $LiH$, $CaH_2$, $MgH_2$, or mixture thereof may be included.

The dehydrogenation reactor 110 is constructed in the form of cartridge to allow the dehydrogenation reactor 110 to be replaced, or the upper part is designed to be opened and closed so that the chemical hydride 111 may be injected or replaced, or a product is exhausted through the lower part and the chemical hydride 111 may be injected, thereby allowing the dehydrogenation reactor 110 to ensure system continuity. Additionally, the dehydrogenation reactor 110 may further include a part for exhausting a slurried hydrolysis reaction product and a part for injecting the chemical hydride 111.

The dehydrogenation reactor 110 may include a heating device that provides heat/temperature useful for the hydrolysis of the chemical hydride 111 or for separate purposes, a cooling apparatus 230 to exhaust reaction heat H when the hydrogen-generating reaction is an exothermic reaction, or a porous metal foam 112 to improve the reaction speed through a catalysis reaction.

For example, the heating device may use electricity or other heat sources, and the cooling apparatus 230 may be implemented as a refrigerant circulation device to exhaust heat generated by the hydrolysis of the chemical hydride 111.

The porous metal foam 112 has a cellular structure composed of a solid metal with gas-filled pores having a predetermined volume. The pores may be sealed (closed cell foam) or interconnected (opened-cell foam), and the porous metal foam 112 may be opened-cell foams. The porous metal foam 112 may have high porosity, and for example, only 5 volume % to 25 volume % of the entire volume may be metal. Accordingly, the porous metal foam 112 may be ultra-lightweight while having a high-surface area. In addition, the porous metal foam 112 may have various characteristics, for example, porosity, pore volume, thickness, alloy composition, or density. The porous metal foam 112 may be integrally formed, or may be disposed by stacking at least one or more thereof.

The porous metal foam 112 may use various materials in consideration of increasing a reaction speed through the catalytic action as well as heat conduction. For example, the porous metal foam 112 may be a porous nickel foam or a porous cobalt-nickel foam. In the case of using the porous nickel foam or the porous cobalt-nickel foam, the heat transfer may be accelerated and the reaction may be accelerated through the metal as the catalytic active sites. It may also help to release the heat of the reaction inside the dehydrogenation reactor 110. In addition, it may act as a distributor so that the acid aqueous solution may be evenly supplied inside the dehydrogenation reactor 110.

The porous metal foam 112 is positioned in the center of the width direction of the dehydrogenation reactor 110 and extends in the length direction of the dehydrogenation reactor 110. At this time, the chemical hydride 111 may be positioned on the outer side in the width direction of the dehydrogenation reactor 110, and the side in the length direction of the porous metal foam 112 may be surrounded by the chemical hydride 111.

In addition, the porous metal foam 112 may be connected to the inlet side through which the acid aqueous solution supplied from the acid aqueous solution tank 120 inflows. At this time, the opposite surface of the surface where the porous metal foam 112 is connected to the dehydrogenation reactor 110 may be surrounded by the chemical hydride 111.

The porous metal foam 112 may uniformly distribute the acid aqueous solution to the chemical hydride 111, maximize heat transfer, and act as a non-uniform catalyst for the dehydrogenation reaction. Accordingly, a barrier may be suppressed from being formed by by-products such as a borate, which may be generated from the chemical hydride 111 after the dehydrogenation reaction and the reaction delay are minimized, thereby maximizing the generation amount of hydrogen.

The dehydrogenation reactor 110 may include the porous metal foam 112 in an amount of 0 to 100 parts by volume with respect to 100 parts by volume of the chemical hydride 111, and for example, it may include 0 to 50 parts by volume thereof. If the porous metal foam 112 includes greater than 50 parts by volume per 100 parts by volume of the chemical hydride 111, the amount of the hydrogen storage may decrease due to space constraints.

The acid aqueous solution tank 120 supplies the acid aqueous solution to the dehydrogenation reactor 110. In other words, the dehydrogenation reaction device 100 is a system that generates hydrogen by injecting the aqueous acid solution into a dehydrogenation reactor 110 including the chemical hydride 111 of the solid state.

In addition, since a separate recovery tank in some cases may not used, the cost and weight of the system may be reduced. In particular, there is a merit that it may be easily exhausted under pressure conditions above 100° C. and above atmospheric pressure when the product is present in the form of a slurry with high fluidity in the container.

The acid aqueous solution tank 120 may have a corrosion-resistant protective film such as Teflon coating to prevent corrosion by the acid aqueous solution.

The acid aqueous solution shortens the reaction time by adjusting the pH of the chemical hydride 111 to promote the dehydrogenation reaction.

The acid may be an inorganic acid such as sulfuric acid, nitric acid, phosphoric acid, boric acid, or hydrochloric acid, an organic acid such as heteropoly acid, acetic acid, formic acid, malic acid, citric acid, tartaric acid, ascorbic acid, lactic acid, oxalic acid, succinic acid, and tauric acid, or mixtures thereof, because the molecular weight is small compared to the hydrogen ion, and the system weight may be reduced and formic acid (HCOOH) may be used as it is safer than hydrochloric acid in a high concentration state. In the case of formic acid, as a weak acid, the pH is maintained, in one example, at about 2 under the conditions described in the present disclosure, so it may be used relatively safely. In addition, captured carbon dioxide may be obtained through hydrogenation, so it is an important material in terms of a recycling of carbon dioxide. In addition, formate is converted to bicarbonate through a dehydrogenation reaction, whereby additional hydrogen may be obtained.

The acid aqueous solution tank 120 is positioned above the dehydrogenation reactor 110 with respect to the direction of gravity, and the acid aqueous solution tank 120 may supply the acid aqueous solution to the dehydrogenation reactor 110 by gravity. That is, the acid aqueous solution tank 120 may supply the acid aqueous solution to the dehydrogenation reactor 110 due to the water level difference. Through this, it is possible to reduce the system cost and weight by minimizing the use of the pump. However, the present disclosure is not limited thereto, and the acid aqueous solution tank 120 may be positioned below the dehydrogenation reactor 110 in the gravity direction and the acid aqueous solution may be supplied to the dehydrogenation reactor 110 by a high pressure pump. In other words, when the acid aqueous solution is injected into the dehydrogenation reactor 110 through a high pressure pump, the pressure of the acid aqueous solution tank may be omitted, and in this case, the position limitation also disappears.

For this purpose, the acid aqueous solution tank 120 may have the same pressure as the dehydrogenation reactor 110 or higher than the pressure of the dehydrogenation reactor 110, and a valve 710 such as a solenoid valve may be mounted between the acid aqueous solution tank 120 and the dehydrogenation reactor 110. In this case, the acid aqueous solution tank 120 does not need to be positioned on the dehydrogenation reactor 110, and may be disposed in a position equivalent to or lower than that of the dehydrogenation reactor 110. For example, the pressurization of the acid aqueous solution tank 120 may be performed by using hydrogen generated in the dehydrogenation reactor 110. Instead of using the above methods, the acidic aqueous solution at atmospheric pressure may be injected into the dehydrogenation reactor 110 using a high pressure pump.

In the dehydrogenation reaction device 100, a dehydrogenation reaction in which hydrogen is produced by the hydrolysis reaction of the chemical hydride 111 with an acid aqueous solution proceeds.

For example, when the chemical hydride 111 is $NaBH_4$ and the acid is $HCOOH$, the dehydrogenation reaction as shown in Reaction Formula 1 below occurs.

$$NaBH_4 + HCOOH + 4H_2O \rightarrow HCOONa + H_3BO_3 + H_2O + 4H_2 \rightarrow HCO_3Na + H_3BO_3 + 5H_2 \quad \text{[Reaction Formula 1]}$$

In the dehydrogenation reactor 110, the dehydrogenation reaction may be performed by reacting 1 mol of hydrogen atoms of the chemical hydride with an acid and water at a molar ratio of 0.5 to 2. If the molar ratio of acid and water is less than 0.5, the chemical hydride 111 may not react sufficiently, and if it is greater than 2, the system weight and reactor volume may increase.

On the other hand, when the acid aqueous solution is used to generate hydrogen from hydrolysis with the chemical hydride 111, water is easily vaporized and loss due to elevated temperature by an exothermic reaction (a water vaporization temperature: 100° C. at 1 bar), so that the amount of hydrogen generated (i.e., a hydrogen storage capacity) may be declined.

Therefore, the dehydrogenation reaction may take place under high temperature and high pressure conditions. This prevents vaporization of water and reduces the amount of the used water, thereby maximizing the amount of generated hydrogen (the water vaporization temperature: 175° C. at 10 bar, 260° C. at 50 bar). In addition, the generation of CO2 may also be suppressed through the pressurization operation of the dehydrogenation reactor 100.

Also, if excess water is included in a hydrogen gas after the reaction, an additional gas-liquid separator may be required, and accordingly the volume and weight of the entire system may be increased and then the hydrogen storage capacity may be decreased. However, high temperature and high pressure operation of the dehydrogenation reactor 100 may increase the hydrogen storage capacity and reduce the system cost and weight.

For example, in the case of the system using $NaBH_4$ and formic acid (HCOOH), the temperature of the dehydrogenation reaction may be 10° C. to 400° C., or 100° C. to 250° C. When the temperature of the dehydrogenation reaction is less than 10° C., the acid or acid aqueous solution may be coagulated or separated, and when the temperature is greater than 400° C., a side reaction such as an occurrence of carbon monoxide may increase.

The pressure of the dehydrogenation reaction may be 1 bar to 100 bar, or 5 bar to 50 bar. If the pressure of the dehydrogenation reaction is less than 1 bar, a decompression pump is used, which may increase the system weight. If the pressure is greater than 100 bar, the dehydrogenation reaction may be inhibited, and the weight and volume of a high temperature/high pressure container may increase.

Accordingly, the gas product generated in the dehydrogenation reactor may contain 99 volume % or greater of hydrogen, 1 volume % or less of water, and 0.1 volume % or less of other impurities.

The generation speed of hydrogen in the dehydrogenation reactor 100 may be controlled by changing the injection speed of the acid aqueous solution or by changing the injection time (a valve open time) while fixing the injection speed. Considering system cost and convenience, one of the high pressure pump and the injection method of the acid aqueous solution by gravity may be selected.

Figure 3:
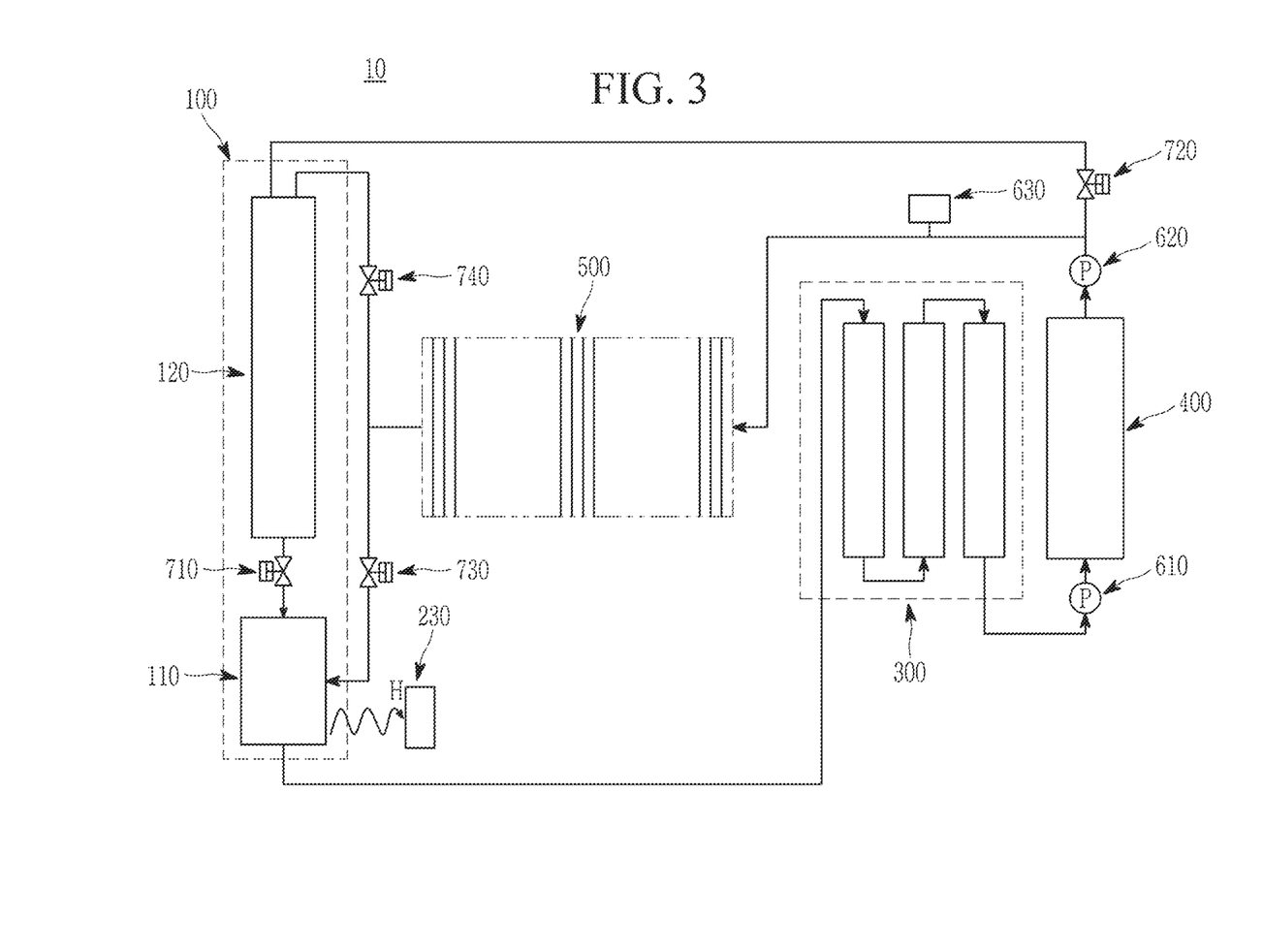
FIG. 3 is a view schematically showing a dehydrogenation reaction device according to another embodiment.

FIG. 3 is a view schematically showing a dehydrogenation reaction device according to another embodiment. Now, the dehydrogenation reaction system is described in detail with reference to FIG. 3.

Referring to FIG. 3, the dehydrogenation reaction system 10 includes the dehydrogenation reactor 110, the acid aqueous solution tank 120, and the fuel cell stack 500, and may selectively further include a gas cooler 300 and a buffer tank 400.

Since the description of the dehydrogenation reactor 110 and the acid aqueous solution tank 120 is the same as described above, a repeated description is omitted.

The dehydrogenation reactor 110 may increase the amount of hydrogen storage by disposing several reactors in parallel as needed.

Hydrogen generated from the dehydrogenation reactor 110 is transferred to the gas cooler 300. The gas cooler 300 cools the supplied hydrogen. The cooling temperature of hydrogen is not particularly limited in the present disclosure, and as an example, it may be a temperature of 10° C. to 60° C.

FIG. 3 shows that the gas cooler 300 is configured of a plurality of chambers sequentially connected to each other, but the present disclosure is not limited thereto, and the gas cooler 300 may be configured of a single chamber.

The hydrogen cooled in the gas cooler 300 is transferred to the buffer tank 400. The buffer tank 400 receives and stores a certain amount of the hydrogen gas.

If desired, pressure regulators 610, 620 may be further included between the dehydrogenation reactor 100 and the gas cooler 300, between the gas cooler 300 and the buffer tank 400, between the buffer tank 400 and the fuel cell stack 500, or a combination thereof. A sensor, a temperature sensor, or a pressure sensor may be further included inside or outside the dehydrogenation reactor 100. A mass flow meter 630 may be further included between the buffer tank 400 and the fuel cell stack 500. Accordingly, the hydrogen gas may be stored in the buffer tank 400 at a constant pressure, and the hydrogen gas may be supplied to the fuel cell stack 500 at a desired pressure and mass.

Meanwhile, as described above, the acid aqueous solution tank 120 may be pressurized by using hydrogen generated in the dehydrogenation reactor 110. The acid aqueous solution tank 120 may receive hydrogen directly from the dehydrogenation reactor 110 or may receive the hydrogen from the gas cooler 300 or the buffer tank 400, or a combination thereof. At this time, the amount of hydrogen gas supplied to the acid aqueous solution tank 120 may be controlled by the valve 720.

The fuel cell stack 500 is positioned on a downstream side of the buffer tank 400 to receive the hydrogen gas from the buffer tank 400. For example, the hydrogen gas may be received from the buffer tank 400 through an intake port such as a valve.

The fuel cell stack 500 generates water by reacting the supplied hydrogen with oxygen and simultaneously generates electrical energy. The water produced in the fuel cell stack 500 is exhausted through exhaust means such as valves, for example. At this time, the water exhausted from the fuel cell stack 500 is recycled to the acid aqueous solution tank 120, the dehydrogenation reactor 110, a separate water tank, or all of them, thereby increasing the hydrogen generation efficiency. At this time, the amount of the water supplied to the acid aqueous solution tank 120 or the dehydrogenation reactor 110 may be controlled by valves 730 and 740.

The fuel cell stack 500 may be any device that converts the hydrogen gas into usable electrical energy, and for example, it may be a proton exchange membrane fuel cell (PEMFC), an alkaline fuel cell (AFC), a phosphoric acid fuel cell (PAFC), a molten carbonate salt fuel cell (MCFC), or a solid oxide fuel cell (SOFC), etc., but the present disclosure is not limited thereto.

For example, the fuel cell stack 500 may pass the generated electrical energy through a power converter such as a DC converter, an inverter, or a charge controller. The power converter may output a part of the electrical energy to an electrical load through a load interconnect, and the other part of the electrical energy may be sent back to the energy storage through a recharging interconnect. Another part of the electrical energy may be used to supply power to a control unit.

The dehydrogenation reaction system 10 prevents the vaporization of the water through the high temperature and high pressure operation of the dehydrogenation reactor 100 and reduces the amount of the used water, so there is no need for a separate gas-liquid separator because the excess water is not included in the hydrogen gas after the reaction.

In the dehydrogenation reaction system 10, the use of the pump may be minimized by allowing the acid aqueous solution tank 120 to supply the acid aqueous solution to the bottom of the dehydrogenation reactor 110 by gravity, however, if desired, a pump, a filter, or both may be further included.

For example, the pump may be used to supply the acid aqueous solution of the acid aqueous solution tank 120 to the dehydrogenation reactor 110, to supply the hydrogen gas generated from the dehydrogenation reactor 110 to the gas cooler 300, to supply the hydrogen gas cooled in the gas cooler 300 to the buffer tank 400, to supply the hydrogen gas stored in the buffer tank 400 to the fuel cell stack 500, to supply the hydrogen gas to the acid aqueous solution tank 120, or to supply the water generated from the fuel cell stack 500 to the dehydrogenation reactor 110 or the acid aqueous solution tank 120.

The filter may substantially remove unwanted particles included in the hydrogen gas by filtering the generated hydrogen gas. The filter may be positioned between the dehydrogenation reactor 110, the gas cooler 300, the buffer tank 400, or the fuel cell stack 500, particularly between the buffer tank 400 and the fuel cell stack 500.

In addition, optionally, the dehydrogenation reaction system 10 may include an outlet for exhausting the mixture of the chemical hydride, the acid, and the water after the reaction has been completed, and may include a device for removing reaction by-products other than hydrogen and the water or converting it to other materials.

Hereinafter, specific embodiments of the disclosure are presented. However, the embodiments described below are only intended to specifically illustrate or describe the disclosure and are not to limit the scope of the disclosure.

(Evaluation Method of Dehydrogenation Reaction)

The chemical hydride 111 is charged into the high temperature and high pressure dehydrogenation reactor 110. The acid aqueous solution mixed in a specific molar ratio is injected using a syringe or a high-pressure pump. At this time, the injection speed may be adjusted from 0.01 mL/min to 20 mL/min, and may vary depending on the size of the dehydrogenation reactor 110 and the amount of the chemical hydride 111.

The pressure and the temperature are measured, and a predetermined pressure and temperature are maintained through valve control and cooling. In some cases, H$_2$O may be injected first and then the acid may be injected.

The hydrogen conversion rate may be calculated by Equation 1 below, and the flow rate and the purity are measured using a mass flow meter and gas chromatography (GC).

The hydrogen conversion rate=((the amount of hydrogen exhausted to the outside of the reactor through the mass flow meter)+(the pressure at the room temperature after the reaction)×(the reactor volume))/(the theoretical hydrogen production amount)  [Equation 1]

Embodiment 1

Figure 4:
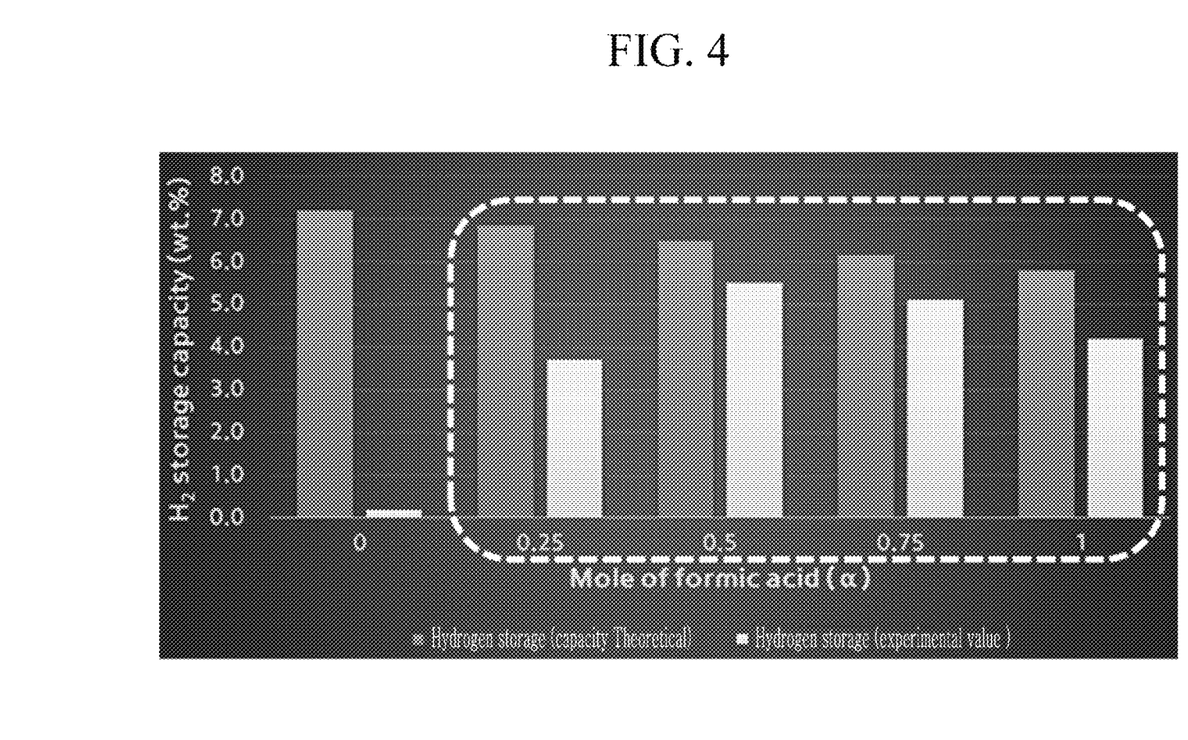
FIG. 4 is a graph showing a result of measuring a hydrogen storage capacity of a dehydrogenation reaction system using formic acid in several molar ratios in an Embodiment 1.

By using the dehydrogenation reaction system 10 according to an embodiment, in the room temperature and the room pressure condition, the dehydrogenation reaction was performed by using NaBH$_4$ as the chemical hydride 111 and HCOOH as the acid, and at this time, the hydrogen storage capacity (the H$_2$ storage capacity, wt %) was measured by performing the dehydrogenation reaction while changing the reaction molar ratio of NaBH$_4$:αHCOOH:βH$_2$O to 0≤α≤1, 3≤β≤4, and α+β=4, and the result is shown in FIG. 4.

Referring to FIG. 4, in Embodiment 1, the reaction like Reaction Formula 2 below is performed, in the room temperature/room pressure condition, a reaction molar sum of HCOOH and H$_2$O is maintained as 4 (for example, to minimize water usage), and as the reacted result, it was confirmed that hydrogen was generated under the condition of 0.25 mol to 1 mol of HCOOH, and hydrogen, which was close to the theoretical storage amount, was generated particularly at 0.5 mol.

[Reaction Formula 2]

$$NaBH_4 + \alpha HCOOH + \beta H_2O \longrightarrow$$
$$\alpha HCOONa + \frac{(1-\alpha)}{\chi} Na_xB_yO_z \cdot \gamma H_2O + 4 H_2\uparrow$$

Embodiment 2

Figure 5:
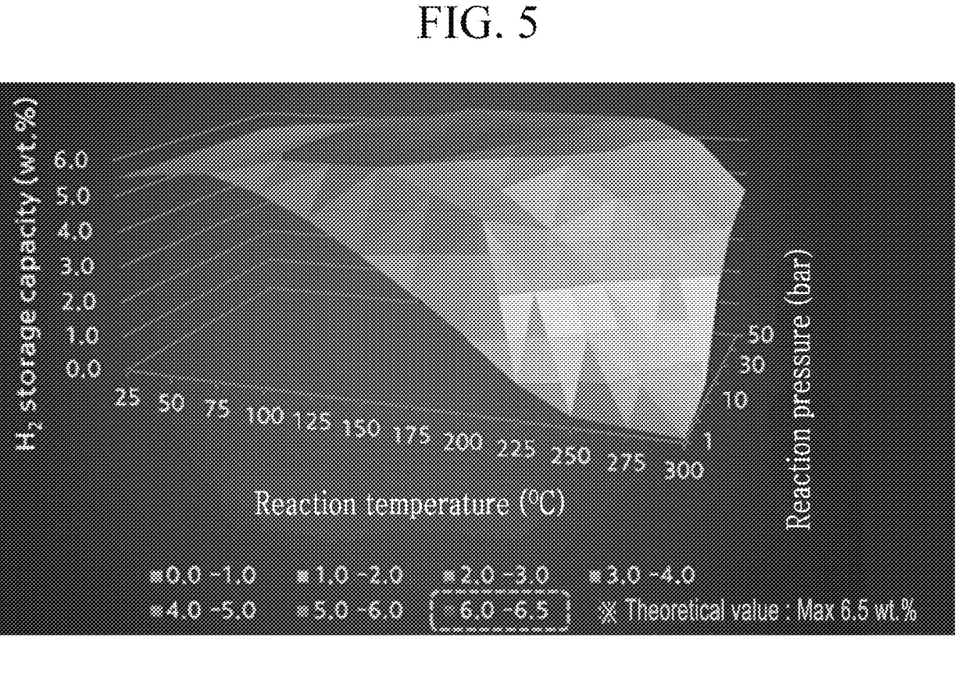
FIG. 5 is a graph showing a result of measuring a hydrogen storage capacity of a dehydrogenation reaction system in an Embodiment 2.

The reaction molar ratio of NaBH$_4$:αHCOOH:βH$_2$O is fixed as α=0.5 and β=3.5, while changing the temperature to 25° C. to 300° C. and the pressure to 1 bar to 50 bar, and the hydrogen storage capacity was measured and the result thereof is shown FIG. 5.

Referring to FIG. 5, In order to obtain the same hydrogen generation amount as the theoretical value by preventing the water vaporization, the reaction temperature and pressure were increased, and as the result confirming the optimum reaction conditions, the hydrogen storage capacity of 6 wt % or greater (theoretical value: 6.5 wt %) was confirmed in the temperature of 100° C. to 250° C. and the pressure of 5 bar to 50 bar, particularly the conversion rate of 97% was achieved at the range of 100° C. to 250° C. and 30 bar to 50 bar.

Embodiment 3

Figure 6:
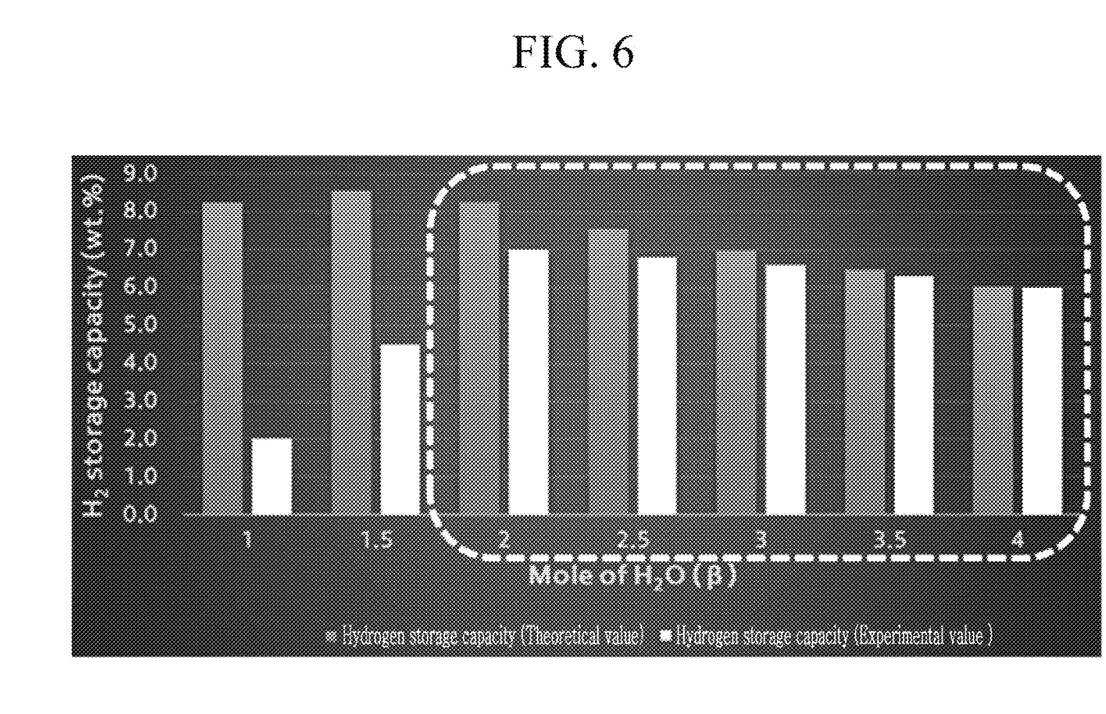
FIG. 6 is a graph showing a result of measuring a hydrogen storage capacity of a dehydrogenation reaction system in an Embodiment 3.

In the condition of 180° C. and 30 bar, while changing the reaction molar ratio of NaBH$_4$:αHCOOH:βH$_2$O to α=0.5 and 2≤β≤4, the hydrogen storage capacity was measured and the result thereof is shown in FIG. 6.

Referring to FIG. 6, as a result of checking the condition for the minimization of the usage amount of the water under a high temperature/high pressure condition, in the case of HCOOH of 0.5 mol, H$_2$O may be reduced to 2 mol, and the hydrogen storage capacity may theoretically reach 8.3 wt % and experimentally 7.0 wt % (the room temperature/room pressure condition: 5.5 wt %).

Embodiment 4

Figure 7:
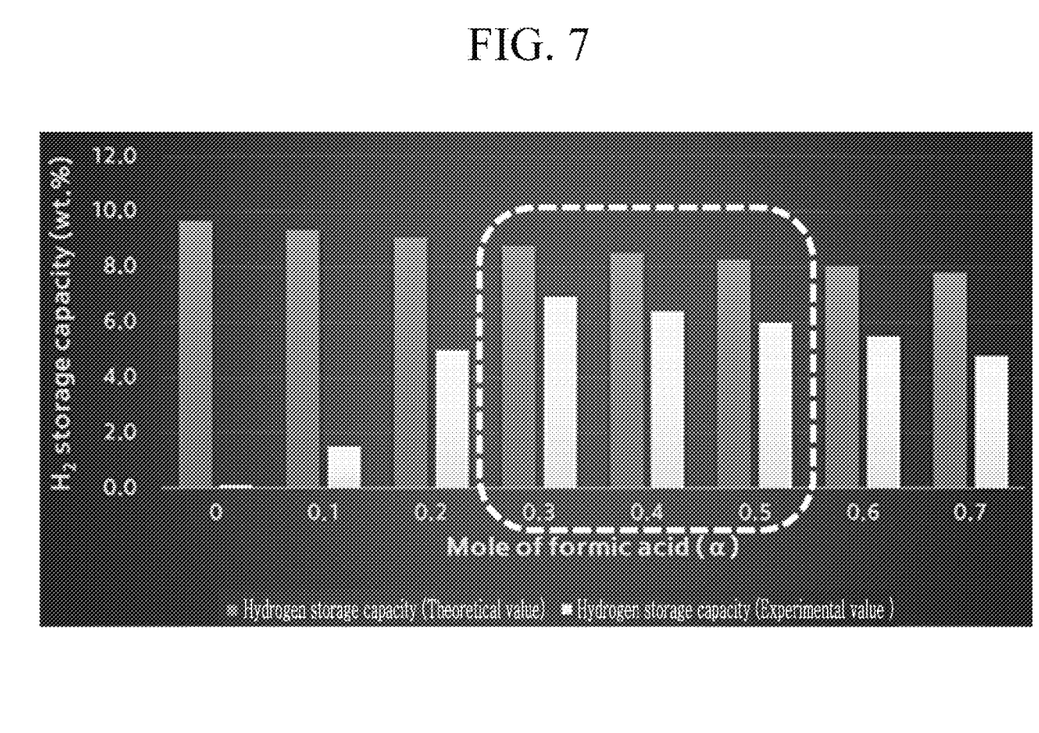
FIG. 7 is a graph showing a result of measuring a hydrogen storage capacity of a dehydrogenation reaction system in an Embodiment 4.

In the condition of 180° C. and 30 bar, while changing the reaction molar ratio of NaBH$_4$:αHCOOH:βH$_2$O to 0≤α≤0.7, 1.8≤β≤2.5, and α+β=2.5, the hydrogen storage capacity was measured and the result thereof is shown in FIG. 7.

Referring to FIG. 7, for the minimization of the usage amount of the water, after fixing the molar ratio sum of HCOOH and H$_2$O as 2.5, as a result of measuring the amount of hydrogen generated according to the HCOOH molar ratio, it was confirmed that the hydrogen storage capacity was 6 wt % or greater in the range of 0.3 mol to 0.5 mol of HCOOH.

Embodiment 5

Figure 8:
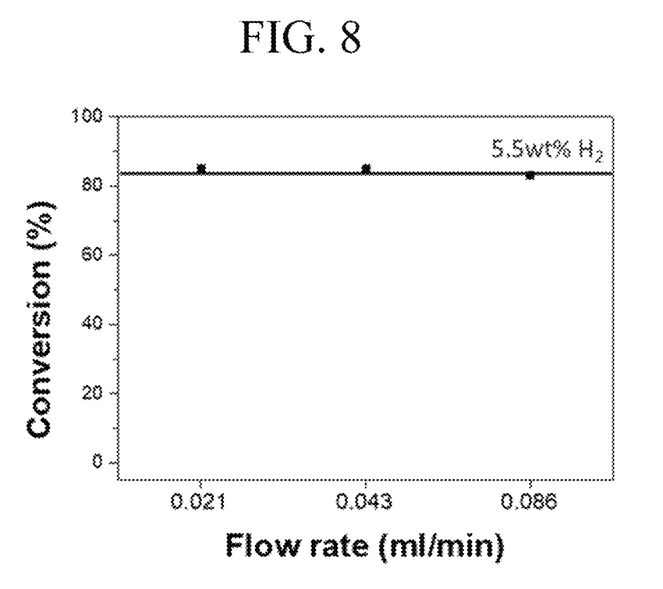
FIG. 8 and FIG. 9 are graphs showing results of measuring a hydrogen generation speed and a conversion rate of a dehydrogenation reaction system in an Embodiment 5.
Figure 9:
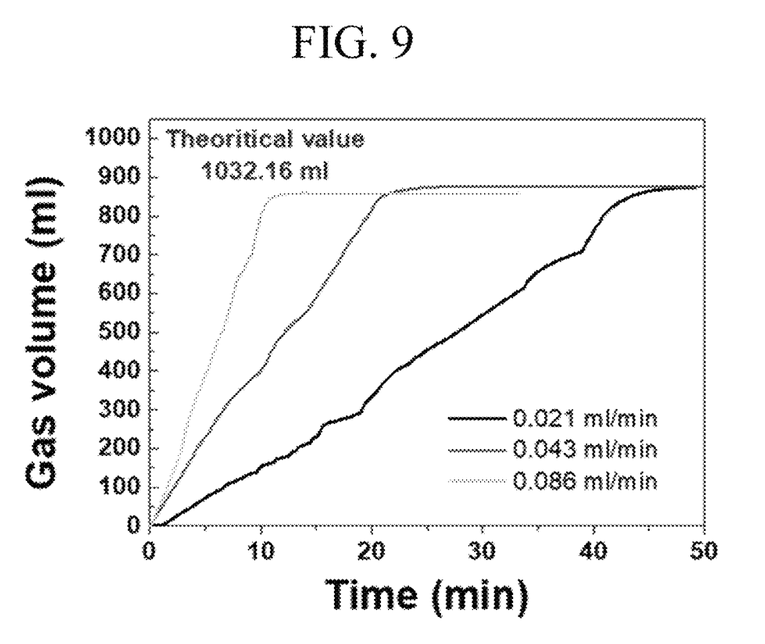

The hydrogen generation speed and the conversion rate were measured while changing the injection speed of the acid aqueous solution, and the result thereof is shown in FIG. 8 and FIG. 9 and is summarized in Table 1. In FIG. 9, the reaction molar ratio of NaBH$_4$:αHCOOH:βH$_2$O was α=0.5 and β=3.5.

TABLE 1

| | | | |
|---|---|---|---|
| Acid aqueous solution injection speed | 0.021 ml/min | 0.043 ml/min | 0.086 ml/min |
| Feed (NaBH$_4$) injection amount | 0.4 g/ 0.867 ml | 0.4 g/ 0.867 ml | 0.4 g/ 0.867 ml |

TABLE 1-continued

| | | | |
|---|---|---|---|
| Starting temperature | 25° C. | 25° C. | 25° C. |
| Reaction temperature | 45° C. | 65° C. | 75° C. |
| Hydrogen generation speed[1] | 15.4 ml/min | 41 ml/min | 80.8 ml/min |
| conversion rate | 85% | 85% | 84% |

[1]hydrogen generation speed based on initial 10 minutes

Referring to FIG. 8, FIG. 9, and Table 1, it is confirmed that the hydrogen generation speed increases as the injection speed of the acid aqueous solution increases. In addition, it was confirmed that the total amount of the generated hydrogen was the same at the conversion rate of 85% and there was no reaction decline due to the increase of speed. That is, it can be seen that the rate of hydrogen generation can be controlled by changing the injection rate of the aqueous acid solution.

Embodiment 6

Figure 10:
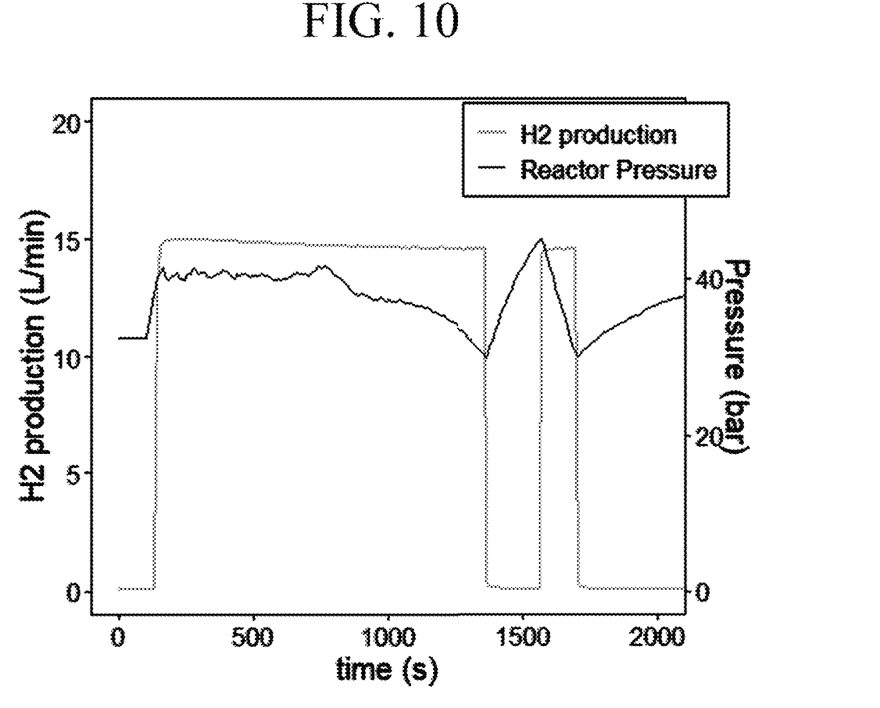
FIG. 10 is a graph showing a result of carrying out a hydrogen generating reaction capable of driving a 1 kW class fuel cell in an Embodiment 6.

Based on the results of FIG. 8, FIG. 9, and Table 1, the dehydrogenation reactor capable of including $NaBH_4$ at 110 g was manufactured and the hydrogen generation reaction (the hydrogen generation speed of 15 L/min) capable of driving a 1 kW class fuel cell was produced, and the result thereof is shown in FIG. 10.

In addition, the dehydrogenation reaction proceeded while changing the system operation and control conditions as shown in Table 2 below, and the results are summarized in Table 2.

TABLE 2

| | | | | | | | |
|---|---|---|---|---|---|---|---|
| $NaBH_4$(SBH) injection amount | 70 g | 70 g | 176 g | 160 g | 70 g | 70 g | 70 g |
| $HCOOH:H_2O$ molar ratio | 0.5:3.5 | 0.5:3.5 | 0.5:3.5 | 0.5:3.5 | 0.5:3.5 | 0.5:3.5 | 0.5:2 |
| Injection equivalent $([mol_{FA} + mol_{H2O}]/mol_{SBH})$ | 8 equivalents | 4 equivalents | 4 equivalents | 4 equivalents | 4 equivalents | 4 equivalents | 2.5 equivalents |
| Valve on/off time (acid aqueous solution injection) | 3 s/27 s | 3 s/27 s | 3 s/12 s | 3 s/12 s | 3 s/12 s | 3 s/12 s | 3 s/12 s |
| Reactor predetermined pressure | 50 bar | 50 bar | 20 bar | 50 bar | 30 bar | 30 bar | 30 bar |
| Starting pressure | 50 bar | 50 bar | 20 bar | 50 bar | 30 bar | Room pressure | Room pressure |
| Reactor inside maximum temperature | 203° C. | 201° C. | 172° C. | 190° C. | 222° C. | — | 216° C. |
| Conversion rate | 100% | 100% | 75.5% | 84% | 100% | — | 75.8% |
| Product volume | 180 L | 180 L | 342 L | 363 L | 180 L | — | 137 L |
| Product form | Liquid + solid | Liquid + solid | Solid (Swelling) | Slurry | Top solid, Bottom slurry | Viscous liquid at100° C. | Solid (viscoelastic) |
| Uniqueness | — | — | Internal clogging | — | — | — | — |

While this disclosure has been described in connection with what is presently considered to be practical embodiments, it is to be understood that the disclosure is not limited to the disclosed embodiments. On the contrary, the present disclosure is intended to cover various modifications and equivalent arrangements included within the spirit and scope of the appended claims.

DESCRIPTION OF SYMBOLS

10: dehydrogenation reaction system
100: dehydrogenation reaction device
110: dehydrogenation reactor
111: chemical hydride
112: porous metal foam
120: acid aqueous solution tank
230: cooling apparatus
300: gas cooler
400: buffer tank
500: fuel cell stack
610, 620: pressure regulator
630: mass flow meter
710, 720, 730, 740: valve

What is claimed is:

1. An operating method for a dehydrogenation reaction system, the operating method comprising:
providing an acid aqueous solution tank including an acid aqueous solution;
providing a dehydrogenation reactor including a chemical hydride of a solid state and receiving an acid aqueous solution from the acid aqueous solution tank to react the chemical hydride with the acid aqueous solution to generate hydrogen;
providing a fuel cell stack receiving hydrogen generated from the dehydrogenation reactor to be reacted with oxygen to generate water and simultaneously to generate electrical energy; and
recycling the water generated from the fuel cell stack to the acid aqueous solution tank, the dehydrogenation reactor, a separate water tank, or all of the acid aqueous solution tank, the dehydrogenation reactor, and the separate water tank,
wherein the acid is formic acid, and wherein, in the dehydrogenation reactor, the temperature is in a range of 10° C. to 400° C. and the pressure is in a range of 17 bar to 100 bar.

2. The operating method of claim 1, wherein the acid aqueous solution is supplied to the dehydrogenation reactor by gravity or a pump.

3. The operating method of claim 1, wherein the dehydrogenation reaction system further includes:
a gas cooler cooling the hydrogen generated from the dehydrogenation reactor; and
a buffer tank that receives and stores hydrogen from the gas cooler.

4. The operating method of claim 3, wherein the dehydrogenation reaction system further includes a pressure regulator between the gas cooler and the buffer tank, between the buffer tank and the fuel cell stack, or both.

5. The operating method of claim 3, wherein the dehydrogenation reaction system further includes a mass flow meter between the buffer tank and the fuel cell stack.

6. The operating method of claim 3, wherein the acid aqueous solution tank is pressurized by receiving hydrogen from the dehydrogenation reactor, the gas cooler, the buffer tank, or a combination thereof.

7. The operating method of claim 1, wherein the dehydrogenation reaction system does not include a gas-liquid separator to separate hydrogen and water from the reaction products produced in the dehydrogenation reactor.

8. The operating method of claim 1, wherein the dehydrogenation reaction system further includes a pump, a filter, or both.

9. The operating method of claim 1, wherein the dehydrogenation reactor includes a heating device, a cooling apparatus, a porous metal foam, or a combination thereof.

10. The operating method of claim 9, wherein:
the porous metal foam is positioned in the center of a width direction of the dehydrogenation reactor and extends in a length direction of the dehydrogenation reactor; and
the side of the length direction of at least the porous metal foam is surrounded by the chemical hydride.

11. The operating method of claim 10, wherein the porous metal foam is a porous nickel foam or a porous cobalt-nickel foam.

12. The operating method of claim 10, wherein the dehydrogenation reactor includes more than 0 parts by volume and 100 parts by volume or less of the porous metal foam with respect to 100 parts by volume of the chemical hydride.

13. The operating method of claim 1, wherein the acid aqueous solution tank is pressurized by supplying hydrogen generated in the dehydrogenation reactor.

14. The operating method of claim 1, wherein the chemical hydride comprises $NaBH_4$, $LiBH_4$, $KBH_4$, $NH_4BH_4$, $NH_3BH_3$, $(CH_3)_4NH_4BH_4$, $NaAlH_4$, $LiAlH_4$, $KAlH_4$, $Ca(BH_4)_2$, $Mg(BH_4)_2$, $NaGaH_4$, $LiGaH_4$, $KGaH_4$, $LiH$, $CaH_2$, $MgH_2$, or a mixture thereof.

15. The operating method of claim 1, wherein, in the dehydrogenation reactor, a dehydrogenation reaction is performed by reacting 1 mol of hydrogen atoms of the chemical hydride with an acid and water at a molar ratio of 0.5 to 2.

16. The operating method of claim 1, wherein a gas product produced in the dehydrogenation reactor includes 99 volume % or greater of hydrogen and 1 volume % or less of water.

* * * * *